United States Patent
Ishii

(10) Patent No.: US 8,750,219 B2
(45) Date of Patent: Jun. 10, 2014

(54) BASE STATION APPARATUS AND COMMUNICATION CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 380 days.

(21) Appl. No.: 12/920,666

(22) PCT Filed: Mar. 11, 2009

(86) PCT No.: PCT/JP2009/054685
§ 371 (c)(1),
(2), (4) Date: Nov. 10, 2010

(87) PCT Pub. No.: WO2009/116441
PCT Pub. Date: Sep. 24, 2009

(65) Prior Publication Data
US 2011/0044275 A1  Feb. 24, 2011

(30) Foreign Application Priority Data
Mar. 19, 2008  (JP) ................. 2008-071636

(51) Int. Cl.
*H04W 4/00* (2009.01)
*H04W 72/00* (2009.01)

(52) U.S. Cl.
USPC .......................................... 370/329; 455/450

(58) Field of Classification Search
USPC ........... 370/329, 311, 537; 455/518, 69, 13.4, 455/450
See application file for complete search history.

(56) References Cited

U.S. PATENT DOCUMENTS

| 8,045,931 B2 * | 10/2011 | Wei et al. .................... 455/69 |
| 8,145,127 B2 * | 3/2012 | Nory et al. ................... 455/13.4 |
| 2006/0018347 A1 * | 1/2006 | Agrawal ....................... 370/537 |
| 2009/0097444 A1 | 4/2009 | Lohr et al. |

FOREIGN PATENT DOCUMENTS

| JP | 2006-262357 A | 9/2006 |
| JP | 2008-053864 A | 3/2008 |
| JP | 2008-510353 A | 4/2008 |
| JP | 2009-529263 A | 8/2009 |
| WO | 2006/016775 A2 | 2/2006 |
| WO | 2007101510 A1 | 9/2007 |

OTHER PUBLICATIONS

Patent Abstracts of Japan, Publication No. 2008-053864, dated Mar. 6, 2008, 1 page.
Patent Abstracts of Japan, Publication No. 2006-262357, dated Sep. 28, 2006, 1 page.
3GPP TR 25.814 V7.0.0, Jun. 2006, "Physical Layer Aspects for Evolved Universal Terrestrial Radio Access (UTRA)," 126 pages.
3GPP TS 36.211 V8.1.0, Nov. 2007, "Evolved Universal Terrestrial Radio Access (E-UTRA), Physical Channels and Modulation," 54 pages.

(Continued)

*Primary Examiner* — Helal A Algahaim
*Assistant Examiner* — Mahmoud Ismail
(74) *Attorney, Agent, or Firm* — Osha Liang LLP

(57) ABSTRACT

A base station apparatus communicates to a user apparatus in an uplink shared channel and controls transmit power for a PHICH (Physical HARQ Indicator Channel) on the shared channel. The transmit power for the PHICH is controlled based on downlink radio quality information (CQI) reported from the user apparatus, information (ACK/NACK) mapped into the PHICH and the presence of transmission of an uplink scheduling grant for indicating transmission of the shared channel.

9 Claims, 8 Drawing Sheets

(56) References Cited

OTHER PUBLICATIONS

3GPP TS 36.300 V8.2.0, Sep. 2007, "Evolved Universal Terrestrial Radio Access (E-UTRA) and Evolved Universal Terrestrial Radio Access Network (E-UTRAN), Overall description," 109 pages.
International Search Report issued in PCT/JP2009/054685, mailed on Jun. 9, 2009, with translation, 8 pages.
Written Opinion issued in PCT/JP2009/054685, mailed on Jun. 9, 2009, 4 pages.
Japanese Office Action for Application No. 2010-503844 mailed on Jan. 15, 2013 (5 pages).
esp@cenet Patent Abstract for Japanese Publication No. 2009-529263, publication date Aug. 13, 2009. (2 pages).
esp@cenet Patent Abstract for Japanese Publication No. 2008-510353, publication date Apr. 3, 2008. (1 page).

* cited by examiner

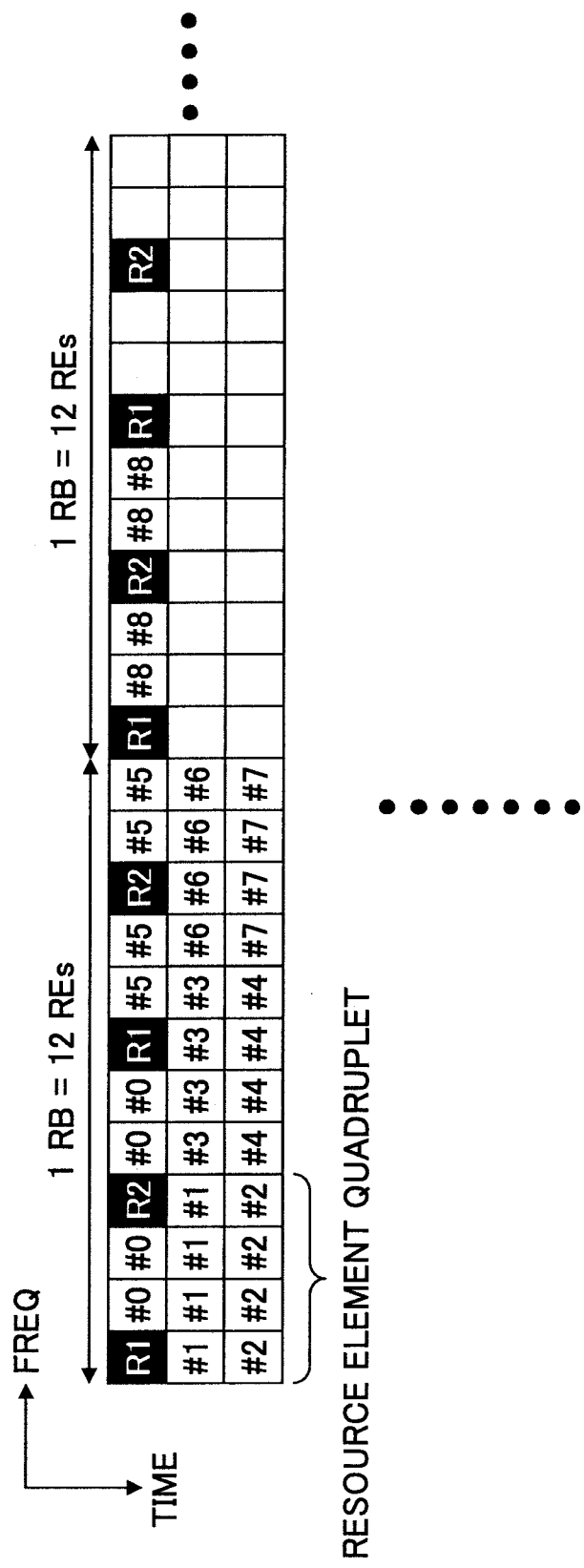

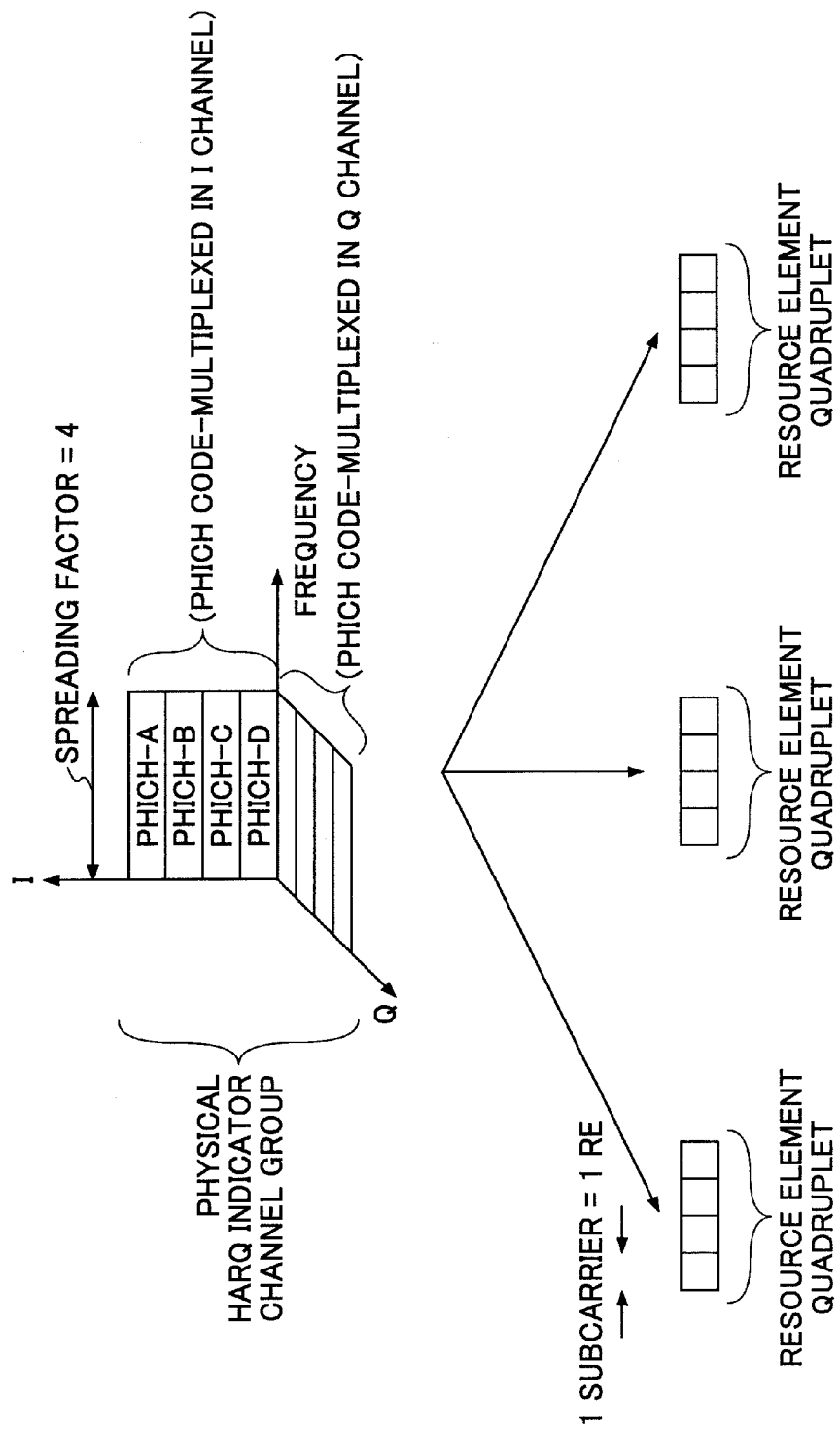

BASE STATION APPARATUS AND COMMUNICATION CONTROL METHOD

TECHNICAL FIELD

The present invention relates to mobile communication systems where OFDM (Orthogonal Frequency Division Multiplexing) is applied in downlinks and particularly relates to base station apparatuses.

BACKGROUND ART

In this type of technical field, the next-generation communication schemes, which may become successors of W-CDMA or HSDPA, are being discussed by standardization group 3GPP for W-CDMA. A typical one of the next-generation communication schemes is LTE (Long Term Evolution). As radio access schemes in the LTE, OFDM (Orthogonal Frequency Division Multiple Access) and SC-FDMA (Single-Carrier Frequency Division Multiple Access) are used in downlinks and uplinks, respectively. See non-patent documents 1 and 2, for example. For convenience, the LTE is illustratively described below, but the present invention is not limited to the specific system.

The OFDM is a multi-carrier based technique for transmitting data in several smaller frequency bands (subcarriers) resulting from segmentation of a frequency band. By arranging the subcarriers on the frequency densely without mutual interference while overlapping the subcarriers partially, it is possible to realize fast transmissions and improve utilization efficiency of the frequency.

The SC-FDMA is a single-carrier based technique where Fourier transform and inverse Fourier transform are applied to segment a frequency band, so that several terminals can use the segmented different frequency bands. The SC-FDMA scheme has characteristics of reduction in inter-terminal interference, smaller variations of transmit power and so on. As a result, it is advantageous to reduction in power consumption, wider coverage and so on.

In LTE systems, one or more physical channels are shared in both uplink and downlink communications among several mobile stations (user apparatuses). The channels shared among the several mobile stations are generally referred to as shared channels. In the LTE, the channels are PUSCH (Physical Uplink Shared Channel) for uplinks and PDSCH (Physical Downlink Shared Channel) for downlinks. Also, transport channels mapped into the PUSCH and the PDSCH are referred to as a UL-SCH (Uplink-Shared Channel) and a DL-SCH (Downlink-Shared Channel), respectively.

Also, it is necessary in communication systems using the above-mentioned shared channels to signal which of the shared channels is to be assigned to which mobile stations for each subframe. In the LTE, control channels for the signaling are referred to as a PDCCH (Physical Downlink Control Channel). The above PDCCH is also referred to as a downlink L1/L2 control channel or downlink control information (DCI). The PDCCH includes information pieces such as a DL/UL scheduling grant and a TPC (Transmission Power Control) bit. See non-patent document 3.

More specifically, the DL scheduling grant may include downlink resource block assignment information, an ID of a user apparatus or user equipment (UE), the number of streams, information on precoding vectors, information on a data size and a modulation scheme, information on HARQ (Hybrid Automatic Repeat reQuest) and so on. The DL scheduling grant may be referred to as DL assignment information, DL scheduling information and so on.

Also, the UL scheduling grant may include uplink resource block assignment information, an ID of a user apparatus or user equipment (UE), information on a data size and a modulation scheme, uplink transmit power information, information on a demodulation reference signal and so on.

The above PDCCH is mapped into the first one to three OFDM symbols in 14 OFDM symbols within one subframe, for example. It is specified how many leading OFDM symbols the PDCCH are to be mapped into through a PCFICH described below, which is indicated to a mobile station.

Also, the PCFICH (Physical Control Format Indicator Channel) and a PHICH (Physical Hybrid ARQ Indicator Channel) are also transmitted in the OFDM symbols including the PDCCH.

The PCFICH is a signal for indicating the number of OFDM symbols including the PDCCH to a mobile station. The PCFICH may be referred to as a DL L1/L2 control format indicator. The PHICH is a channel for transmitting acknowledgement information for the PUSCH. The acknowledgment information has ACK (Acknowledgement) as a positive response and NACK (Negative Acknowledgement) as a negative response.

In downlinks, the PDCCH, the PCFICH and the PHICH are mapped into the first M symbols (M=1, 2 or 3) within one subframe. Then, transmit power control is applied to each of these channels to achieve efficient multiplexing and transmission.

Non-patent document 1: 3GPP TR 25.814 (V7.0.0), "Physical Layer Aspects for Evolved UTRA", June 2006

Non-patent document 2: 3GPP TS 36.211 (V8.1.0), "Physical Channels and Modulation", November 2007

Non-patent document 3: 3GPP TS 36.300 (V8.2.0), "E-UTRA and E-UTRAN Overall description", September 2007

DISCLOSURE OF INVENTION

Problem to be Solved by the Invention

As stated above, in downlinks in the LTE, the PDCCH, the PCFICH and the PHICH are mapped into the first M symbols (M=1, 2 or 3) within one subframe, and the transmit power control is applied to each of the channels.

For example, if a greater amount of transmit power is allocated to the PDCCH, the PCFICH and the PHICH, the error rate of these channels can be lower, and accordingly stable communications can be expected. However, resources for the transmit power is limited, and thus if the resources are excessively consumed, smaller amounts of the PDCCH, the PCFICH and the PHICH can be multiplexed. In other words, if such an excessive amount of transmit power is allocated to the channels, the system efficiency might be reduced.

On the other hand, if a smaller amount of transmit power is allocated to the PDCCH, the PCFICH and the PHICH, the error rate of the PDCCH, the PCFICH and the PHICH can be higher, and accordingly it might be hard to conduct stable communications.

One object of the present invention is to realize appropriate transmit power for control channels (e.g., the PHICH).

Means for Solving the Problem

One aspect of the present invention particularly relates to a PHICH among a PDCCH, a PCFICH and the PHICH, and transmit power for a PHICH is determined based on downlink radio quality information CQI, information contents ACK/

NACK mapped into the PHICH and information as to whether an UL scheduling grant is transmitted.

Advantage of the Invention

According to the aspect of the present invention, it is possible to realize appropriate transmit power for control channels including the PHICH.

BRIEF DESCRIPTION OF DRAWINGS

FIG. 3A schematically illustrates exemplary subcarrier mapping;

FIG. 3B schematically illustrates a PHICH (ACK/NACK) mapping method;

LIST OF REFERENCE SYMBOLS

Figure 1:
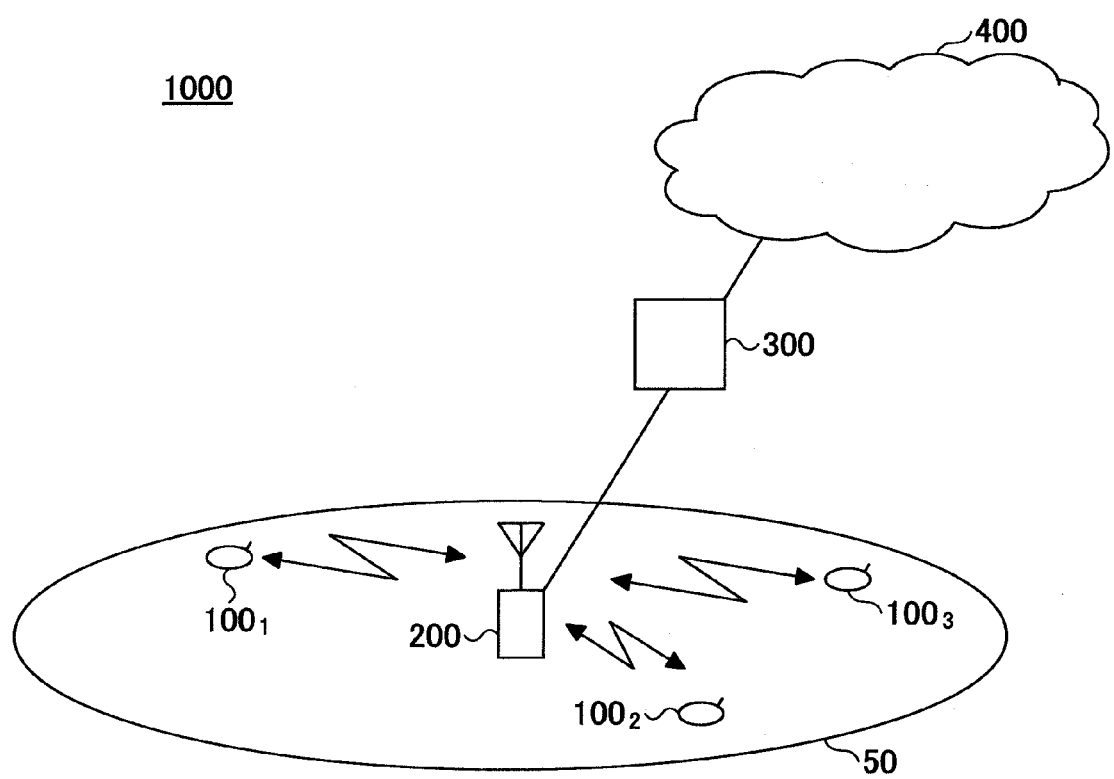
FIG. 1 is a block diagram illustrating an arrangement of a radio communication system according to one embodiment of the present invention.

50: cell
$100_1$, $100_2$, $100_3$, $100_n$: user apparatus
200: base station apparatus
300: access gateway apparatus
400: core network
402: reception unit (Rx)
404: CP removal unit
406: fast Fourier transform unit (FFT)
408: demultiplexing unit
410: CQI reception unit
412: PUSCH reception unit
414: MAC processing unit
416: PHICH signal generation unit
4162: PHICH transmit power control unit
418: PCFICH signal generation unit
420: PDCCH signal generation unit
422: PDSCH signal generation unit
424: reference signal generation unit
426: multiplexing unit (MUX)
428: inverse fast Fourier transform unit (IFFT)
430: CP addition unit
432: transmission unit (Tx)

BEST MODE FOR CARRYING OUT THE INVENTION

According to embodiments of the present invention, transmit power of the PHICH (Physical HARQ Indicator Channel) is set based on downlink radio quality information CQI, AKC/NACK mapped into the PHICH and whether to transmit a UL scheduling grant. Accordingly, the transmit power of the PHICH can be properly controlled.

Next, the best mode for implementing the present invention is described below based on embodiments asset forth with reference to the drawings. Throughout all the drawings for illustrating the embodiments, the same references are used for elements having the same functions and are not repeatedly described.

Embodiment 1

[System]
FIG. 1 illustrates a radio communication system using a base station apparatus according to one embodiment of the present invention. A radio communication system 1000 is an Evolved UTRA and UTRAN (alternatively referred to as LTE (Long Term Evolution) or Super 3G) applied system, for example. The system includes a base station apparatus (eNB: eNode B) 200 and multiple user apparatuses or user equipment (UE) $100_n$ ($100_1$, $100_2$, $100_3$, ..., $100_n$ where n is a positive integer). The base station apparatus 200 is connected to an upper station such as an access gateway apparatus 300, and the access gateway apparatus 300 is connected to a core network 400. The user apparatuses $100_n$ communicate to the base station apparatus 200 in a cell 50 in accordance with Evolved UTRA and UTRAN. The access gateway apparatus 300 may be referred to as a MME/SGW (Mobility Management Entity/Serving Gateway).

The user apparatuses $100_1$, $100_2$, $100_3$, ..., $100_n$ have the same arrangement, function and state, and thus the user apparatus $100_n$ is described below unless specifically stated otherwise. For convenience, the user apparatuses wirelessly communicate to the base station apparatus, but more generally, the user apparatuses include mobile terminals and fixed terminals.

In the radio communication system 100, OFDMA (Orthogonal Frequency Division Multiplexing Access) and SC-FDMA (Single Carrier-Frequency Division Multiplexing Access) schemes are applied to downlinks and uplinks, respectively, as radio access schemes. As mentioned above, the OFDMA is a multi-carrier transmission scheme where a frequency band is segmented into several smaller frequency bands (subcarriers) and data is mapped into the individual subcarriers. The SC-FDMA is a single-carrier transmission scheme where a frequency band is segmented for different terminals and the multiple terminals use different frequency bands for reduction in inter-terminal interference.

[Communication Channel]
Next, various communication channels for use in the system are described. For downlinks, a PDSCH (Physical Downlink Shared Channel) shared among the user apparatuses $100_n$ and a PDCCH (Physical Downlink Control Channel) are used. The PDCCH may be also referred to as a downlink L1/L2 control channel. Also, information mapped into the PDCCH may be referred to as downlink control information (DCI).

User data, that is, a normal data signal, is transmitted in the PDSCH. A transport channel mapped into the PDSCH is a DL-SCH (Downlink Shared Channel). Also, a downlink/uplink scheduling grant, a transmit power control command bit and so on are transmitted in the PDCCH.

For example, the downlink scheduling grant (DL-Grant) includes an ID of a user communicating over the PDSCH, transport format information of the user data, that is, information on a data size, a modulation scheme and HARQ, assignment information of downlink resource blocks and so on. The downlink scheduling grant may be referred to as downlink scheduling information.

For example, the uplink scheduling grant (UL-Grant) includes an ID of a user communicating over a PUSCH (Physical Uplink Shared Channel), transport format information on the user data, that is, information on a data size and a modulation scheme, assignment information of uplink resource blocks, information on transmit power for uplink shared channels and so on. The above uplink resource block may correspond to a frequency resource and be referred to as a resource unit. In this embodiment, the UL-Grant is not only for permitting an uplink shared channel to be transmitted but also for discriminating whether the permitted transmission corresponds to retransmission. There are various discrimination ways. For example, identification information or an indicator may be included in the UL-Grant for indicating whether the transmission corresponds to retransmission. The identification information may be referred to a new data indicator.

PDCCH mapped OFDM symbols include a PCFICH (Physical Control Format Indicator Channel) and/or a PHICH (Physical HARQ Indicator Channel). In other words, the PDCCH, the PCFICH and the PHICH are multiplexed and transmitted in less than or equal to a predefined number of OFDM symbols.

The PCFICH is a channel for indicating the number of PDCCH mapped OFDM symbols to a user apparatus.

The PHICH is a channel for transmitting acknowledgement information to the PUSCH. The acknowledgement information is represented as ACK indicating a positive response or NACK indicating a negative response.

In addition to or instead of general meaning of the ACK being the positive response, the ACK mapped into the PHICH may be interpreted to refrain from retransmission at a predefined immediately subsequent retransmission timing without reception of a UL-Grant. (The temporal relationship between the transmission timing and the retransmission timing of a certain packet is fixed beforehand in synchronous type HARQ. In this definition, if a user apparatus has not received the UL-Grant upon receiving the ACK in the PHICH, the user apparatus does not retransmit the PUSCH at the immediately subsequent retransmission timing. At a subsequent retransmittable timing, however, if the user apparatus receives the UL-Grant and is instructed to retransmit the PUSCH, the user apparatus retransmits the PUSCH as instructed. In this case, the ACK may not necessarily mean that the PUSCH has been successfully received. The ACK only means that the retransmission of the PUSCH may be reserved at the immediately subsequent retransmission timing. If an UL scheduling grant for indicating retransmission is received, the retransmission is initiated. Thus, even if the user apparatus receives the above-defined ACK, the user apparatus must not discard the already transmitted PUSCH and has to store it in a retransmission buffer. In this case, if the user apparatus is instructed to initiate a new transmission in a HARQ process where the ACK has been received from a base station apparatus, the user apparatus would discard the already transmitted PUSCH.

In the above-mentioned example, the PHICH and the PCFICH are defined as channels having the relationship parallel to the PDCCH. However, the PHICH and the PCFICH may be defined as information elements included in the PDCCH.

For uplinks, a PUSCH (Physical Uplink Shared Channel) shared among the user apparatuses $100_n$ and a LTE uplink control channel are used. For the LTE uplink control channel, there are two types of channels, that is, a channel transmitted as a portion of the PUSCH and a frequency multiplexed channel. The frequency multiplexed channel is referred to as a PUCCH (Physical Uplink Control Channel). User data, that is, normal data signals, are transmitted in the PUSCH. A transport channel mapped into the PUSCH is an UL-SCH (Uplink Shared Channel). Also, downlink quality information used for scheduling operations for the PDSCH and AMCS (Adaptive Modulation and Coding Scheme) and acknowledgement information for the PDSCH are transmitted in the LTE uplink control channel. The acknowledgement information includes contents represented as either a positive response (ACK) or a negative response (NACK).

In addition to the CQI and the acknowledgement information, a scheduling request for requesting resource assignment for uplink shared channels and so on may be transmitted in the LTE uplink control channel. Here, the resource assignment for the uplink shared channels means that a base station apparatus uses a physical downlink control channel for a certain subframe, that is, an uplink scheduling grant, to indicate to a user apparatus that the user apparatus may communicate using an uplink shared channel in a subsequent subframe.

[Subframe Arrangement]

Figure 2:
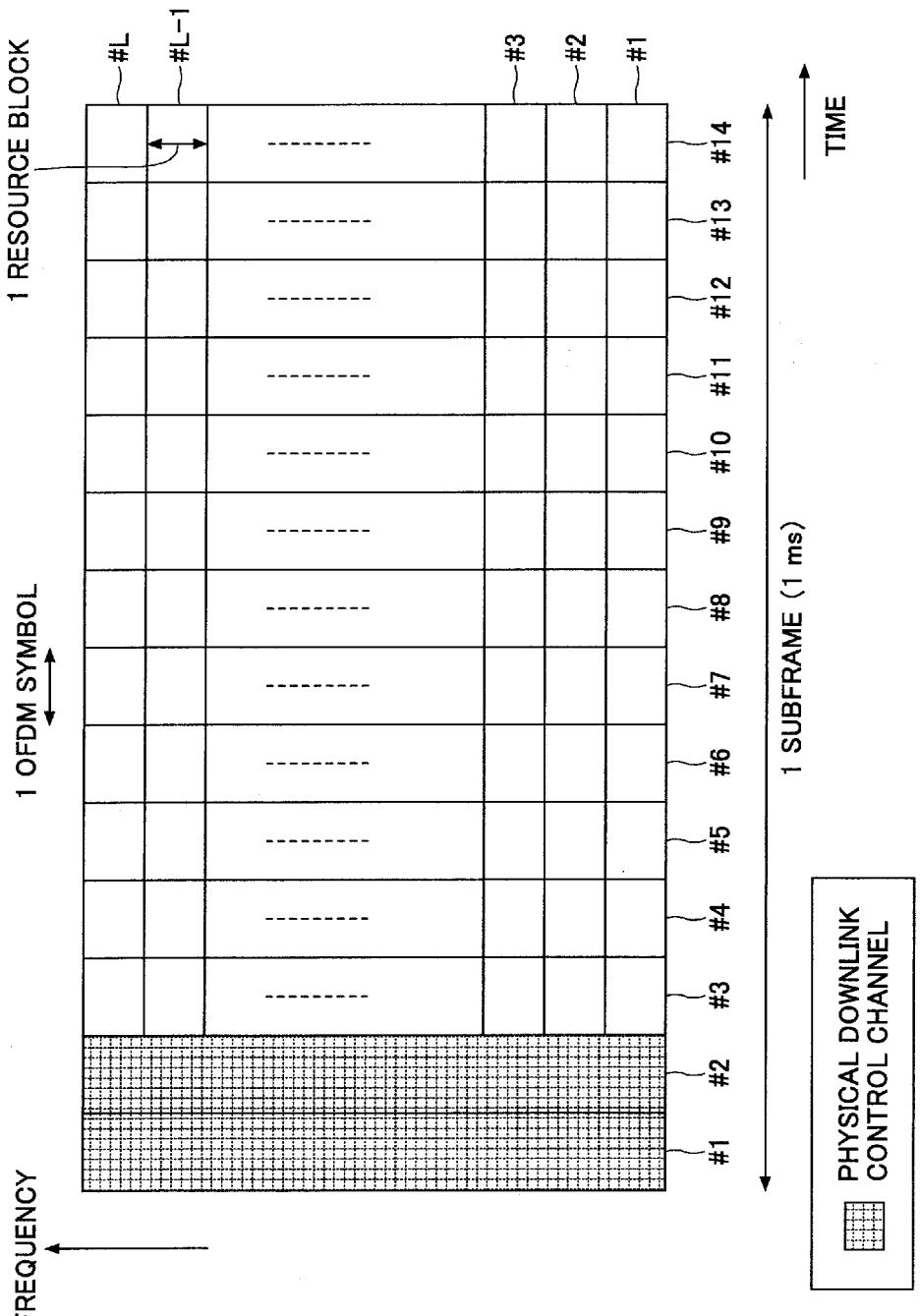
FIG. 2 schematically illustrates a subframe arrangement.

FIG. 2 illustrates an exemplary subframe arrangement. In downlink transmission, one subframe consists of 1 ms, for example, and includes fourteen OFDM symbols. In FIG. 2, the numbers (#1, #2, #3, . . . , #14) in the time axial direction are for identifying the OFDM symbols, and the numbers (#1, #2, #3, . . . , #L−1, #L (where L is an positive integer) in the frequency axial direction are for identifying resource blocks.

The above-mentioned PDCCH and so on are mapped into the first M OFDM symbols in a subframe. Three values "1", "2" and "3" are set to the M. In FIG. 2, the above PDCCH is mapped into the first two OFDM symbols in one subframe, that is, OFDM symbols #1 and #2 (M=2). Then, user data, a synchronization channel (SCH) (also referred to as a synchronization signal), a physical broadcast channel (BCH) and/or a persistent scheduling or semi-persistent scheduling applied data channel are mapped into OFDM symbols other than PDCCH mapped OFDM symbols. Note that the above-mentioned user data correspond to IP packets for web browsing, file transfer (FTP), VoIP and so on and/or control signals for radio resource control (RRC). The user data is mapped into a PDSCH as a physical channel and as a DL-SCH as a transport channel.

Also, in the frequency direction, L resource blocks are provided in a system band. Here, a frequency bandwidth per one resource block may be set to 180 kHz, for example, and the single resource block includes twelve subcarriers, for example. In addition, the total number L of resource blocks may be set to 25 if the system bandwidth is equal to 5 MHz, 50 if the system bandwidth is equal to 10 MHz, 100 if the system bandwidth is equal to 20 MHz, and so on.

[Resource Assignment]

Exemplary resource assignment within the first M OFDM symbols in one subframe is described below. For convenience, physical resources identified in one subcarrier and one OFDM symbol is referred to as one resource element (RE).

FIG. 3A illustrates a situation where the PDCCH and so on are mapped into the first three OFDM symbols in a subframe (M=3). The PDCCH, the PCFICH, the PHICH and so on are mapped into resources other than a resource for downlink reference signal in resources in these M OFDM symbols. The resources available for the mapping of the PDCCH and so on are segmented for each four consecutive resource elements in the frequency direction except for the reference signal. The resources corresponding to the segmented four resource elements are referred to as a resource element quadruplet. The resource element quadruplet may be also referred to as a resource element group. The resources are assigned to the PDCCH, the PCFICH, the PHICH and so on by applying the resource element quadruplet as one minimum unit. Here, the resource element quadruplets are numbered first in the time direction and then in the frequency direction. For example, assuming that there are 25 resource blocks and 12 subcarriers exist for each resource block in the system bandwidth of 5 MHz, there would be 300 subcarriers for each OFDM symbol. In the illustrated example, eight resource element quadruplets exist for each resource block (M=3). In this case, 25×8=200 resource element quadruplets would exist in the overall 25 resource blocks.

Under assumption that a downlink reference signal is transmitted from the second antenna even in single antenna transmission, the resource element quadruplets are defined. In the illustrated example, reference signals R1 and R2 are transmitted from the first and second antennas, respectively. In this case, the resource element quadruplets are defined under the assumption that the transmission from the second antenna is actually made regardless of whether the transmission is actually made.

The present invention relates to PHICH transmit power control, and thus a PHICH mapping method is described in detail below.

FIG. 3B illustrates a situation where the PHICH is mapped. The PHICH is mapped into a physical HARQ indicator channel group consisting of three resource element quadruplets. More specifically, the PHICH is code-multiplexed (CDMA) into 12 resource elements corresponding to three resource element quadruplets at the spreading rate of 4 and I/Q multiplexed and mapped. In other words, eight PHICHs are multiplexed into one physical HARQ indicator channel group. Four of the PHICHs are code-multiplexed in I component side, and four of the PHICHs are code-multiplexed in Q component side. These eight PHICHs are mapped into 12 resource elements. As stated above, the resource element corresponds to a resource identified in one OFDM symbol and one subcarrier. The above-mentioned three resource element quadruplets may be adjacent or distributed within a system band. One or more of the above-mentioned physical HARQ indicator channel group may be provided within one subframe.

Also, numbers corresponding to the smallest number in PUSCH mapped resource blocks (RBs) are attached to the different PHICHs. For example, it is assumed that numbers are sequentially attached to resource blocks within a system band from the lower frequency side. (If the system bandwidth is equal to 5 MHz, $1^{st}$ through $25^{th}$ resource blocks are present.) If the base station apparatus 200 receives the PUSCH mapped into $4^{th}$ through $8^{th}$ resource blocks, the base station apparatus 200 uses $4^{th}$ PHICH to transmit the PHICH corresponding to the PUSCH. By predefining the correspondence between resource block numbers used for the PUSCH and PHICH mapping positions, the PHICH mapping positions do not have to explicitly signaled to a user apparatus for every time.

Note that the above-mentioned resource assignment to the PDCCH, the PCFICH and PHICH is simply illustrative and the resource assignment may be carried out in any other manner. For example, the resource assignment may be based on code multiplexing, frequency multiplexing or time multiplexing. Alternatively, a combination of the code multiplexing, the frequency multiplexing and the time multiplexing may be applied.

In FIG. 3, the case where the number of PDCCH mapped OFDM symbols is equal to 3 has been intensively described. However, the above-mentioned resource assignment method and the mapping method may be similarly applied to the case of one or two PDCCH mapped OFDM symbols.

[Base Station Apparatus-eNB]

Figure 4:
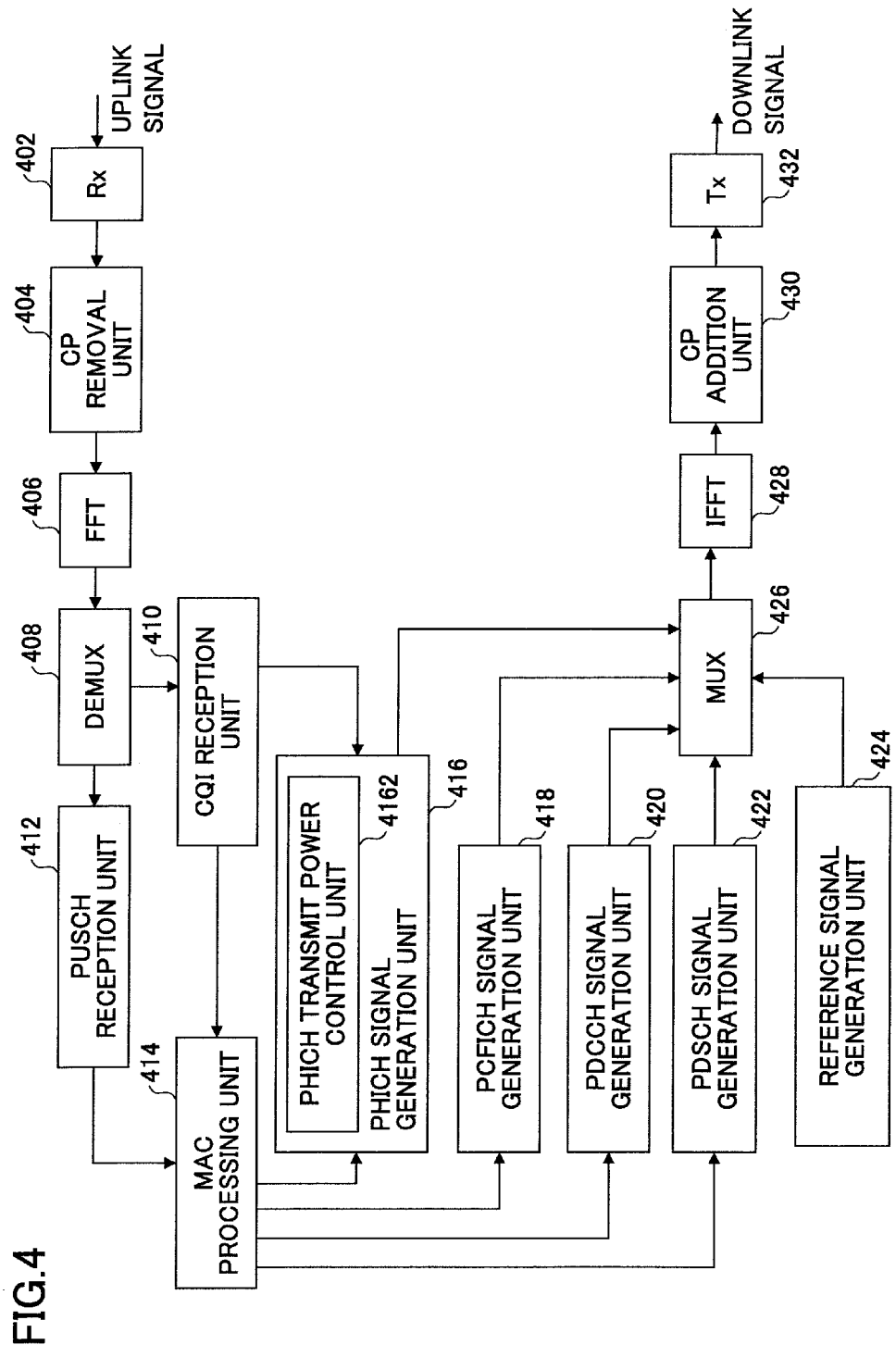
FIG. 4 is a partial block diagram illustrating a base station apparatus according to one embodiment of the present invention.

Referring to FIG. 4, a base station apparatus 200 according to one embodiment of the present invention is described. In FIG. 4, a reception unit (Rx) 402, a CP removal unit 404, a fast Fourier transform unit (FFT) 406, a demultiplexing unit (DEMUX) 408, a CQI reception unit 410, a PUSCH reception unit 412, a MAC processing unit 414, a PHICH signal generation unit 416, a PCFICH signal generation unit 418, a PDCCH signal generation unit 420, a PDSCH signal generation unit 422, a reference signal generation unit 424, a multiplexing unit (MUX) 426, an inverse fast Fourier transform unit (IFFT) 428, a CP addition unit 430 and a transmission unit (Tx) 432 are illustrated.

The reception unit (Rx) 402 receives an uplink signal and performs power amplification, frequency conversion, band limiting, analog-to-digital conversion and others on the signal to derive a received baseband signal.

The CP removal unit 404 removes a signal portion corresponding to a guard interval from the received signal. The guard interval may be also referred to as a cyclic prefix (CP).

The fast Fourier transform unit (FFT) 406 performs fast Fourier transform on an incoming signal to convert a time domain signal into frequency domain signal.

The demultiplexing unit (DEMUX) 408 extracts various signals mapped into different subcarriers. Although a received signal includes various communication channels as already described, the PUSCH and the PUCCH are particularly important in this embodiment. For simplified illustration, other potentially received channels are omitted in FIG. 4.

The CQI reception unit 410 restores the CQI from the received signal. The CQI represents the quality of a downlink radio channel state measured by a user apparatus.

The PUSCH reception unit 412 restores the received PUSCH. Specifically, the PUSCH reception unit 412 performs IDFT operations, de-interleaving, data demodulation, channel decoding and so on.

The MAC processing unit 414 performs (a) reception operations in MAC retransmission control over uplink user data, (b) scheduling, (c) transmission format selection, (d) frequency resource assignment and so on.

(a) The MAC processing unit 414 performs retransmission control operations (ACK/NACK determination and so on) in a MAC layer. After reception operations in the MAC retransmission control, the MAC processing unit 414 informs the PHICH signal generation unit 416 and the PHICH transmit power control unit 4162 which of the ACK or the NACK the PHICH transmitted in a subframe of interest indicates.

Also, the MAC processing unit 414 informs the PHICH transmit power control unit 4162 of information indicating whether to transmit an UL-Grant to a user apparatus destined for the PHICH in that subframe. In other words, the MAC processing unit 414 transmits information indicating whether to transmit both of the PHICH and the UL-Grant or only the PHICH to the user apparatus destined for the PHICH in the subframe. This information is determined at the base station apparatus. Note that the determination may be made in consideration of intention of the user apparatus or at an upper apparatus to the base station apparatus.

(b) In the scheduling, a user apparatus to transmit user data using a shared channel in a predefined subframe is selected. As algorithms available for this selection, for example, round robin, proportional fairness and MAX-C/I are present. In the proportional fairness and the MAX-C/I, for example, evaluation metrics are calculated for user apparatuses, and the user apparatuses having a greater evaluation metric are selected for communications in a shared channel in a subframe of interest. Here, the evaluation metric corresponds to a priority indicative of priority order of assigning radio resources. In other words, in the proportional fairness and the MAX-C/I, the radio resource assigned user apparatuses are selected in accordance with the priority indicative of the priority order of assigning the radio resources.

(c) In the transmission format selection, transport format information on a modulation scheme, a coding rate, a data size and so on for user data transmitted by the user apparatus selected in the scheduling is determined. For example, the modulation scheme, the coding rate and the data size may determined based on SIR for a sounding reference signal transmitted from the user apparatus in uplinks or path loss between the base station apparatus and the user apparatus.

(d) In the frequency resource assignment, resource blocks used to transmit the user data from the user apparatuses selected in the scheduling are determined. For example, the determination of the resource blocks may be made based on the SIR for the sounding reference signal transmitted from the user apparatuses in uplinks.

In addition, the MAC processing unit 414 also performs MAC retransmission control such as HARQ transmission operations, (f) scheduling, (g) transmission format selection, (h) frequency resource assignment and others.

(f) In the downlink scheduling, user apparatuses are selected to communicate in a downlink shared channel in a subframe of interest.

(g) Also in the transmission format selection, transport format information on a modulation scheme, a coding rate, a data size and others on the downlink shared channel transmitted to the user apparatuses selected in the scheduling is determined. For example, the determination of the modulation scheme, the coding rate and the data size may be made based on CQI reported from the user apparatuses in uplinks.

(h) In this case, in the frequency resource assignment, resource blocks used to transmit the downlink shared channel transmitted to the user apparatuses selected in the scheduling are determined. For example, the determination of the resource blocks may be made based on the CQI reported from the user apparatuses in uplinks. Note that the CQI is supplied from the CQI reception unit 410.

The MAC processing unit 414 informs the PDCCH signal generation unit 420 of contents (users, resources and so on) determined in the above-mentioned uplink related operations, that is, an uplink scheduling grant. Also, the MAC processing unit 414 informs the PDCCH signal generation unit 420 and the PDSCH signal generation unit 422 of contents determined in the above-mentioned downlink related operations, that is, a downlink scheduling grant. In addition, the MAC processing unit 414 transmits user data to the PDSCH signal generation unit 422 in a subframe of interest.

The PHICH signal generation unit 416 receives information transmitted in a PHICH (Physical HARQ Indicator Channel) in a subframe of interest. This information specifically includes ACK or NACK being a determination result for retransmission control over a received PUSCH, the number of PHICH for transmission in the subframe of interest, an ID of a destination user apparatus and so on. Then, the PHICH signal generation unit 416 generates a PHICH signal based on the number of PHICH. Here, the PHICH signal generation unit 416 generates the PHICH based on transmit power information determined at the PHICH transmit power control unit 4162. Note that an arbitrary number of PHICHs may be transmitted in one subframe. The transmit power for the PHICH is determined at the PHICH transmit power control unit 4162. The transmit power is advantageously determined in one embodiment of the present invention. Details of the transmit power control are described below.

The PCFICH signal generation unit 418 generates a PCFICH indicating the number of OFDM symbols to map the PDCCH, the PHICH and so on (M=1, 2 or 3). Specific contents of the PCFICH are determined based on the number of multiplexed users. Alternatively, the number of OFDM symbols specified in the PCFICH may be fixed.

The PDCCH signal generation unit 420 generates a downlink control channel (PDCCH or downlink L1/L2 control channel).

The PDSCH signal generation unit 422 generates a PDSCH (Physical Downlink Shared Channel).

The reference signal generation unit 424 generates a reference signal for downlink transmission.

The PDCCH signal generation unit 420, the PDSCH signal generation unit 422 and so on perform known operations such as channel encoding, data modulation and interleaving for downlink transmission.

Note that although no transmit power control unit is illustrated for the PCFICH signal generation unit 418, the PDCCH signal generation unit 420, the PDSCH signal generation unit 422 and the reference signal generation unit 424 for simplicity, the transmit power control units are actually provided. This embodiment has an important feature on how to determine the transmit power for the PHICH, and accordingly the PHICH transmit power control unit 4162 is explicitly illustrated. Specific operations of the transmit power control are described below.

The multiplexing unit (MUX) 426 generates a signal including one or more of the PHICH, the PCFICH, the PDCCH, the PDSCH and the reference signal. In general, the multiplexing unit 426 uses FDM and/or TDM techniques to multiplex these signals (pr channels).

The inverse fast Fourier transform unit (IFFT) 428 performs inverse fast Fourier transform on the multiplexed signal to convert a frequency domain signal into a time domain signal.

The CP addition unit 430 adds a guard interval (cyclic prefix) to the converted signal and generates transmission symbols.

The transmission unit (Tx) 432 converts the baseband transmission symbols into a radio signal. The transmission unit 432 performs known operations such as digital-to-analog conversion, frequency conversion, band limiting and power amplification.

Specific operations of the transmit power control in the PHICH transmit power control unit 4162 are described below.

[First Embodiment of PHICH Transmit Power Control]

The PHICH transmit power control unit 4162 receives downlink radio quality information, that is, CQI, for a user apparatus transmitting a PHICH in a subframe of interest from the CQI reception unit 410. Here, the CQI may be average CQI (wideband CQI) over the overall system band.

The PHICH transmit power control unit 4162 receives information indicating whether to transmit not only the PHICH but also the UL-Grant to a user apparatus destined for the PHICH in a subframe of interest from the MAC processing unit 414. In other words, this embodiment have options on transmission of the PHICH and/or the UL-Grant. One case is that both of them are transmitted, and the other case is that either of them is transmitted. In general, the UL-Grant is control information for permitting transmission of an uplink shared channel and specifies resources available in the transmission. In a case of retransmission control in accordance with synchronous type HARQ, a time interval between a transmission timing of a certain PUSCH and a timing when the PUSCH can be retransmitted is fixed to a constant value (e.g., six or eight subframes). If the same resources are always used in the initial transmission and the retransmission, the UL-Grant would be unnecessary for the retransmission. However, there is a likelihood that the radio transmission state may be changed from the initial transmission timing to the retransmission timing. In this case, it is desirable that different radio resources be used between the initial transmission and the retransmission. For this viewpoint, it is conceived that the radio resources for use in the retransmission are indicated in the UL-Grant. In this case, it is desirable that the user apparatus can determine whether the UL-Grant indicated radio resources are for the retransmission. For example, the UL-Grant may include identification information or an indicator for indicating whether the resources are for retransmission.

Alternatively, although the case where a decoding result of an uplink shared channel is NG and retransmission is requested is described in the above-mentioned example, in the case of the decoding result of the uplink shared channel being OK, there are two options, that is, transmission of both the PHICH and the UL-Grant and transmission of either of them. For example, if the decoding result of the uplink shared channel is OK and the user apparatus has data to be transmitted at the next transmission timing in a data buffer, the PHICH indicating ACK and the UL-Grant indicating new transmission are transmitted to the user apparatus. On the other hand, if the decoding result of the uplink shared channel is OK and the user apparatus has no data to be transmitted at the next transmission timing in the data buffer, only the PHICH indicating ACK is transmitted to the user apparatus. Also, if the decoding result of the uplink shared channel is OK and no radio resource for assigning the user apparatus at the next transmission timing are present, only the PHICH indicating ACK is transmitted to the user apparatus.

In this manner, the above embodiment conceives not only the case where the PHICH is transmitted but the UL-Grant is not transmitted but also the case where both of them are transmitted. Depending on the different cases, the transmit power is appropriately controlled.

The PHICH transmit power control unit 4162 determines transmit power for the PHICH transmitted in a subframe of interest based on information on the CQI, the PHICH and/or the UL-Grant. As one example, the transmit power $P_{PHICH}$ for the PHICH may be determined based on the following formula. Note that this formula is calculated in dB values.

$$P_{PHICH} = P_{ref} + CQI_{ref} - CQI + \Delta_{PHICH},$$

where $P_{ref}$ is reference transmit power, $CQI_{ref}$ is reference CQI, and CQI is CQI received from the CQI reception unit. In other words, the CQI corresponds to CQI reported from a user apparatus destined for the PHICH.

The $\Delta_{PHICH}$ according to this embodiment represents an offset value, and different offset values are set for the cases of transmission of only the PHICH and transmission of both the PHICH and the UL-Grant.

For example, $\Delta_{PHICH}$ may be set as follows.
(A) Case of transmission of only the PHICH $$P_{PHICH} = P_{ref} + CQI_{ref} - CQI + \Delta_{PHICH}, (\Delta_{PHICH} = 3 \text{ dB})$$

(B) Case of transmission of both the PHICH and the UL-Grant $$P_{PHICH} = P_{ref} + CQI_{ref} - CQI + \Delta_{PHICH}, (\Delta_{PHICH} = 0 \text{ dB})$$

In other words, the transmit power for the PHICH in Case (A) is set to be higher than that in Case (B).

In the case where a user apparatus receives both the PHICH and the UL-Grant, even for the PHICH having a higher error rate, if the UL-Grant has been successfully received, retransmission can be appropriately controlled. This is still true in the case where the system is configured in such a manner that if the user apparatus has received both the PHICH and the UL-Grant, the user apparatus subsequently transmits PUSCHs based on the UL-Grant without considering the PHICH. Thus, in the case where both the PHICH and the UL-Grant are transmitted from a base station apparatus, the transmit power for the PHICH may be set to be lower. In the case where only the PHICH is transmitted, however, a higher reception quality of the PHICH has to be maintained. From this viewpoint, the transmit power for the PHICH in Case (A) is set to be higher than that in Case (B). As a result, retransmission can be appropriately controlled while saving transmit power resources, which leads to efficient communications.

Figure 5:
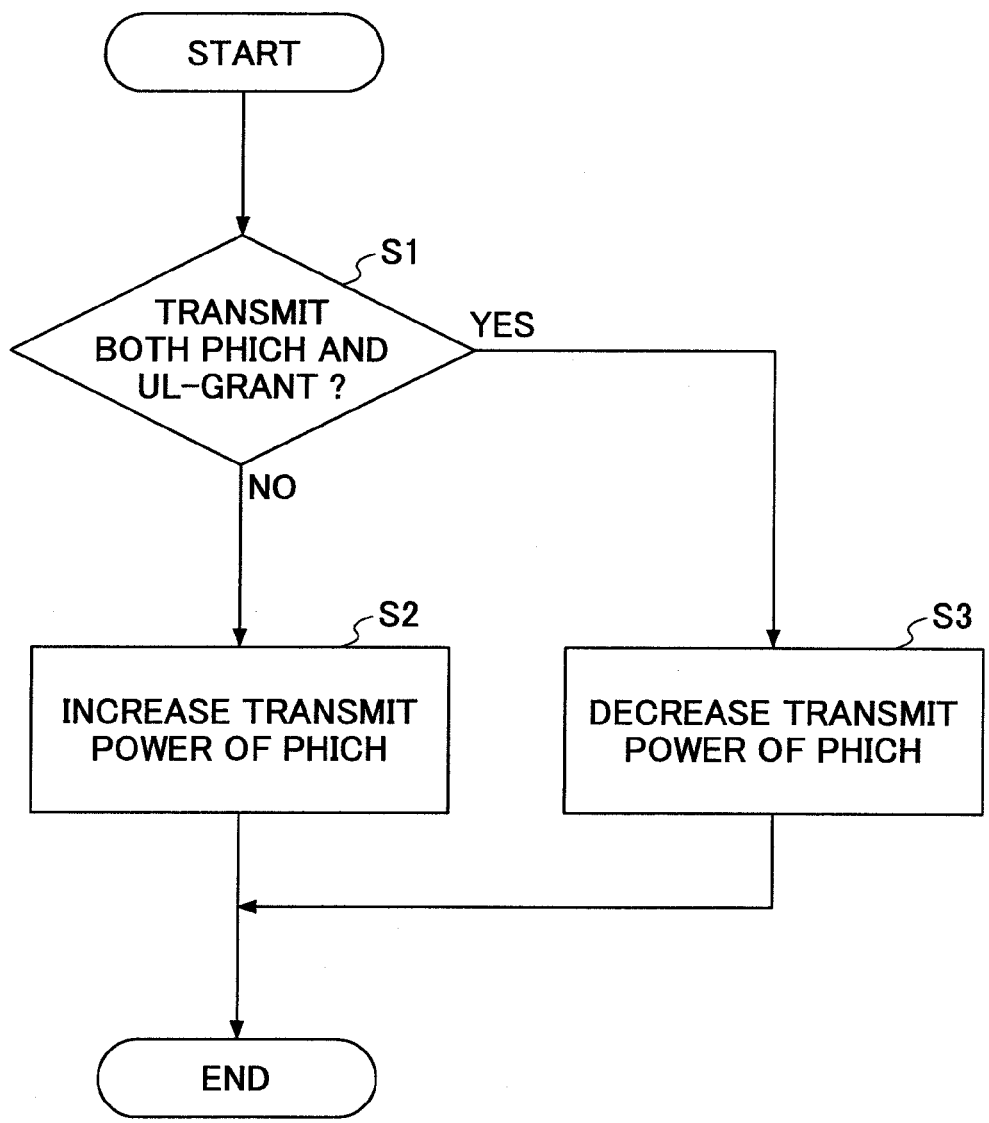
FIG. 5 is a first flowchart of an exemplary operation according to one embodiment of the present invention.

FIG. 5 is a flowchart illustrating the above-mentioned exemplary operations. At S1, it is determined whether to transmit both the PHICH and the UL-Grant to a user apparatus. If both the PHICH and the UL-Grant are not transmitted (NO), that is, if only the PHICH is transmitted, the transmit power for the PHICH is set to be higher at S2. This corresponds to the above-mentioned Case (A). On the other hand, if both the PHICH and the UL-Grant are transmitted (YES), the transmit power for the PHICH is set to be lower at S3. This corresponds to the above-mentioned Case (B).

As stated above, in the case of the UL-Grant being transmitted, the transmission of the PHICH may be insignificant. In this case, the PHICH may not be transmitted. For example, the transmit power may be set as follows.
(C) Case of transmission of only the PHICH $$P_{PHICH} = P_{ref} + CQI_{ref} - CQI + \Delta_{PHICH}, (\Delta_{PHICH} = 0 \text{ dB})$$

(D) Case of transmission of the UL-Grant $$P_{PHICH} = \text{OFF}$$

Note that OFF represents that the transmit power has true value 0.

In this manner, the transmit power corresponding to consumption in the above-mentioned Case (B) can be saved, and the saved transmit power can be allocated to other signals. As a result, the signal quality of the PDCCH and so on can be improved.

[Second Embodiment of PHICH Transmit Power Control]

The PHICH transmit power control unit 4162 may receive information indicating whether information transmitted in the PHICH in a subframe of interest corresponds to ACK or NACK from the MAC processing unit 414.

Then, $\Delta_{PHICH}$ may be set as follows.
(E) Case of transmission of ACK in the PHICH $$P_{PHICH} = P_{ref} + CQI_{ref} - CQI + \Delta_{PHICH}, (\Delta_{PHICH} = 3 \text{ dB})$$

(F) Case of transmission of NACK in the PHICH $$P_{PHICH} = P_{ref} + CQI_{ref} - CQI + \Delta_{PHICH}, (\Delta_{PHICH} = 0 \text{ dB})$$

In other words, the transmit power for the PHICH in Case (E) is set to be higher than that in Case (F).

If a user apparatus determines that it has received NACK, a previously transmitted PUSCH is transmitted based on a frequency resource, a modulation scheme and a payload size in the previous transmission in HARQ. Thus, if the user apparatus erroneously determines ACK as NACK, the user apparatus would retransmit the PUSCH. After transmitting ACK to the user apparatus, the base station apparatus conceives that it will not receive the PUSCH from the user apparatus. As a result, there is a likelihood that other user apparatuses may be assigned resource blocks that might be used in the retransmission through scheduling. In this case, the PUSCH retransmitted from the user apparatus making the erroneous determination of ACK as NACK may conflict with new PUSCHs transmitted from other user apparatuses, resulting in degraded signal quality of both the PUSCHs.

On the other hand, if the user apparatus erroneously determines NACK as ACK, the user apparatus does not retransmit the corresponding PUSCH. In this case, a frequency resource reserved for retransmission is wasted. On the other hand, the resource is not utilized by any user apparatus, and thus the above-mentioned conflict does not arise. However, the PUSCH to be retransmitted is not retransmitted, and thus packet loss may arise in the PUSCH.

For this reason, quality requirements for ACK received by the user apparatus may be different from quality requirements for NACK depending on situations. From the viewpoint of avoidance of the conflict between the retransmitted PUSCH and the new PUSCH, it is important to receive ACK correctly. In this case, the transmit power is preferably set as in the above-mentioned Cases (E) and (F). On the other hand, from the viewpoint of prevention of the packet loss, it may be important to receive NACK correctly. In this case, $\Delta_{PHICH}$ may be set as follows.

(G) Case of transmission of NACK in the PHICH $$P_{PHICH}=P_{ref}+CQI_{ref}-CQI+\Delta_{PHICH}, (\Delta_{PHICH}=3\ dB)$$

(H) Case of transmission of ACK in the PHICH $$P_{PHICH}=P_{ref}+CQI_{ref}-CQI+\Delta_{PHICH}, (\Delta_{PHICH}=0\ dB)$$

In any of the cases, the quality of either ACK or NACK can be particularly improved depending on the purpose. In this manner, it is advantageous to control the transmit power depending on the contents (ACK/NACK) of the PHICH.

Figure 6:
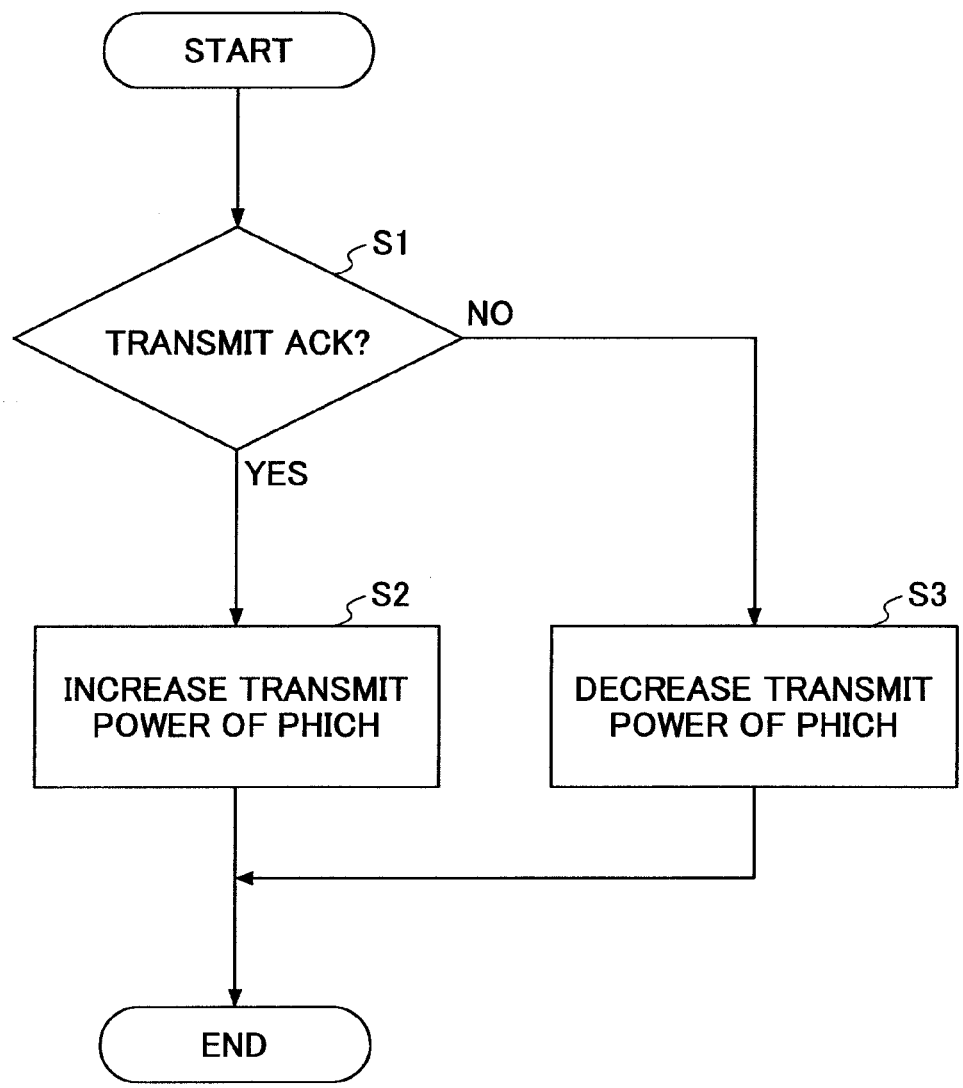
FIG. 6 is a second flowchart of an exemplary operation according to one embodiment of the present invention.

FIG. 6 is a flowchart illustrating the above-mentioned exemplary operations. At S1, it is determined whether the PHICH transmitted to a user apparatus corresponds to ACK. If the PHICH corresponds to ACK (YES), the transmit power for the PHICH is set to be higher at S2. This corresponds to the above-mentioned Case (E). On the other hand, if the PHICH corresponds to NACK (NO), the transmit power for the PHICH is set to be lower at S3. This corresponds to the above-mentioned Case (F).

[Third Embodiment of PHICH Transmit Power Control]

Figure 7:
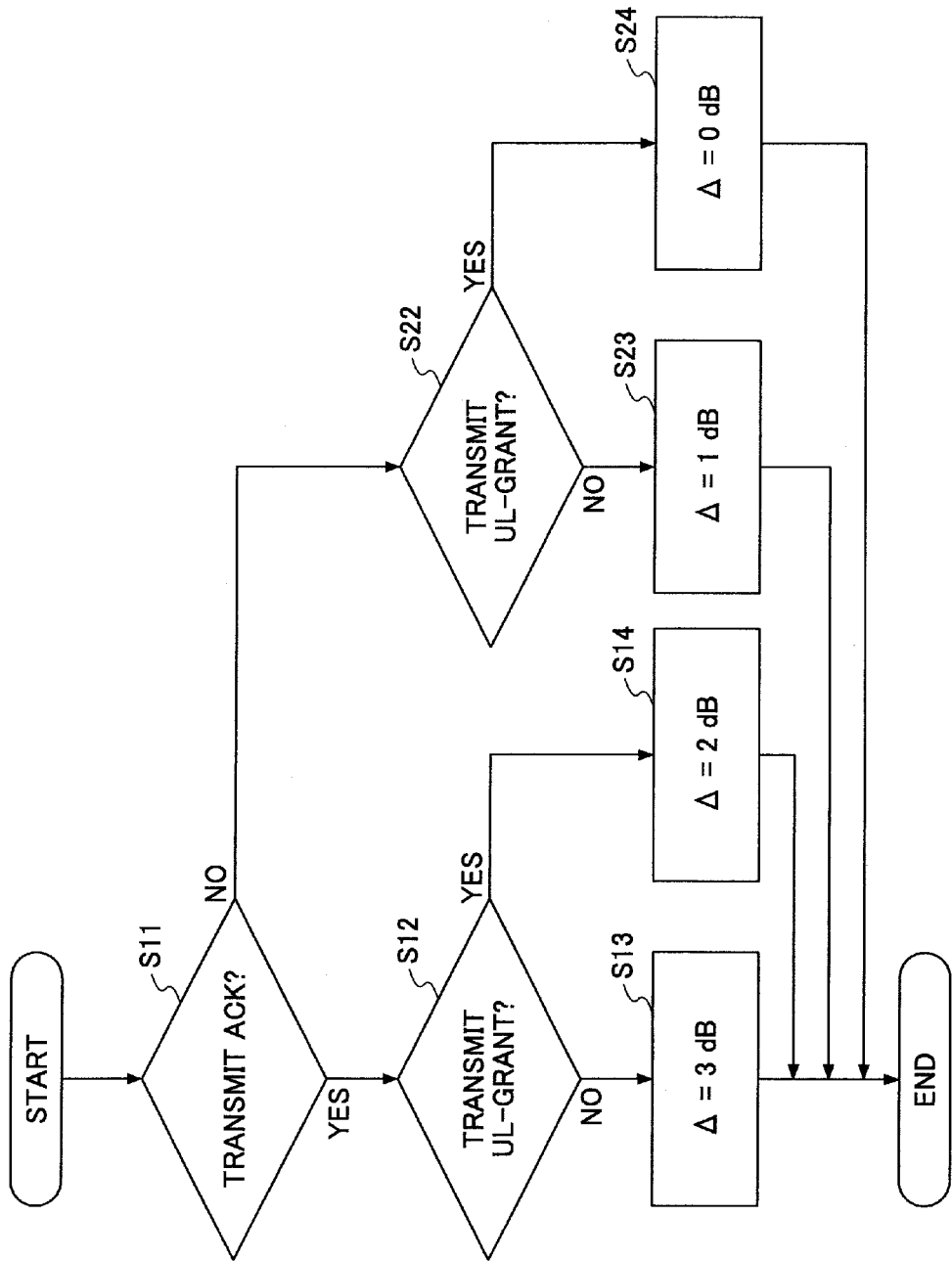
FIG. 7 is a third flowchart of an exemplary operation according to one embodiment of the present invention.

FIG. 7 is a flowchart illustrating exemplary operations corresponding to a combination of the above-mentioned control methods. At S11, it is determined whether the PHICH transmitted to a user apparatus corresponds to ACK. If the PHICH corresponds to ACK (YES), it is determined whether the UL-Grant is also transmitted at S12. If the UL-Grant is not transmitted, only the PHICH indicative of ACK is transmitted to the user apparatus. In this case, the transmit power is set to be higher at S13, for example, $\Delta_{PHICH}=3$ dB in the illustrated embodiment. For simplicity, the suffix "PHICH" of "$\Delta$" is omitted in the illustration. If it is determined that the UL-Grant is transmitted at S12, not only the PHICH but also the UL-Grant are transmitted to the user apparatus. In this case, higher priority is provided to contents of the UL-Grant in the user apparatus, and accordingly the transmit power for the PHICH is set to lower than that in the case of no transmission of the UL-Grant (S13) at S14, for example, $\Delta_{PHICH}=2$ dB in the illustrated embodiment.

Similar operations are performed in the case of the PHICH corresponding to NACK (the case of NO at S11). From the viewpoint of preventing collision between a new packet and a retransmission packet, quality requirements for NACK may be lower than those for ACK. For this reason, the transmit power may be set to be lower than that in the above-mentioned case. At S12, it is determined whether the UL-Grant is also transmitted. If the UL-Grant is not transmitted, only the PHICH indicative of NACK is transmitted to the user apparatus. In this case, the transmit power is set to be higher than that in the case of transmission of the UL-Grant at S23, for example, $\Delta_{PHICH}=1$ dB in the illustrated embodiment. On the other hand, if it is determined that the UL-Grant is transmitted at S22, not only the PHICH but also the UL-Grant are transmitted to the user apparatus. In this case, high priority is provided to contents of the UL-Grant in the user apparatus, and thus the transmit power for the PHICH is set to be lower than that in the case of transmission of the UL-Grant at S24, for example, $\Delta=0$ dB in the illustrated embodiment.

The values set for $\Delta_{PHICH}$ at steps S13, S14, S23 and S24 are simply illustrative. The values set at S13 and S14 are greater than those for S23 and S24, but the fact is not essential. From the viewpoint of power savings in the case where ACK is more reliably transmitted to a user apparatus than NACK and the UL-Grant is present, three or more values are preferably provided to the offset $\Delta_{PHICH}$. Also, the determination as to whether the PHICH corresponds to ACK (S11) and the determination as to whether the UL-Grant is transmitted (S12, S22) may be reverse in order or performed simultaneously.

In the above-mentioned embodiment, the offset is applied to the PHICH transmit power calculated from downlink radio quality information CQI reported from a user apparatus of interest, and the offset value is set based on the determination as to whether the PHICH corresponds to ACK or whether the UL-Grant is transmitted. In this manner, the PHICH transmit power control according to the present invention is realized. Instead, the PHICH transmit power control according to the present invention may be realized by applying the offset to a different downlink channel and setting the offset value based on the determination as to whether the PHICH corresponds to ACK or whether the UL-Grant is transmitted. Here, the different downlink channel may be a channel where the transmit power is controlled in closed loop using TPC commands and so on, for example.

Alternatively, the PHICH transmit power control according to the present invention may be realized by applying the offset to a fixed transmit power amount and setting the offset value based on the determination as to whether the PHICH corresponds to ACK or whether the UL-Grant is transmitted.

Alternatively, the PHICH transmit power control according to the present invention may be realized by applying the offset to the PHICH transmit power calculated from different radio quality information and setting the offset value based on the determination as to whether the PHICH corresponds to ACK or whether the UL-Grant is transmitted. Here, the different radio quality information may be path loss between the user apparatus and the base station apparatus, UE Power Headroom or a reception level of a downlink reference signal reported from the user apparatus.

Also, the above-mentioned $\Delta_{PHICH}$ value may be set based on logical channel types, priority, service types, contract types, receiver types and/or cell types.

The logical channel types represent logical channel types such as a DCCH (Dedicated Control Channel) and a DTCH (Dedicated Traffic Channel). Further several logical channels may be defined within the DCCH and the DTCH.

In addition, the priority indicates priority regarding downlink and uplink data transmissions, and data having the first priority is transmitted in priority over data having the second priority, for example. The priority may be associated with the logical channels and referred to as logical channel priority. Alternatively, the priority may be defined as a priority class.

The service types indicate types of service for transmitting downlink packets and include a VoIP service, an audio service, a streaming service, FTP (File Transfer Protocol) service and so on, for example.

Also, the contract types indicate types of contract enrolled by the user of the user apparatus and include low class contract or high class contract, flat rate charge or pay-as-you-go charge and so on, for example.

Also, the receiver types are for classifying capability of a user apparatus destined for a downlink signal and include terminal capabilities such as user apparatus identification based classes, reception enabled modulation schemes and reception enabled bit numbers, for example.

Also, the cell types indicate types of user apparatus resident cells and include cell identification based classes, indoor or outdoor, suburb area or urban area, high traffic zone or low traffic zone and so on, for example.

In the above-mentioned embodiments, the Evolved UTRA and UTRAN (Long Term Evolution or Super 3G) applied system has been described. However, the base station apparatus and the communication control method according to the present invention may be applied to any other appropriate system that uses signals corresponding to the PHICH, UL-Grant and so on and controls the transmit power for the PHICH and so on. For example, the present invention may be applied to a HSDPA/HSUPA based W-CDMA system, an IMT-Advanced system, a WiMAX, a Wi-Fi based system and so on.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and two or more disclosed embodiments or items may be combined as needed or a disclosed certain embodiment or item may be applied to another disclosed embodiment or item (if consistent). In order to facilitate better understandings of the present invention, specific formulae have been used for illustration. However, these formulae are simply illustrative, and any other appropriate formula may be used, unless specifically stated otherwise. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2008-071636 filed on Mar. 19, 2008, the entire contents of which are hereby incorporated by reference.

The invention claimed is:

1. A base station apparatus for receiving an uplink shared channel from a user apparatus and informing the user apparatus whether the user apparatus has to retransmit the uplink shared channel, comprising:
   a transmit power control unit configured to determine transmit power for a HARQ indicator channel for indicating a positive response or a negative response to the uplink shared channel; and
   a transmitting unit configured to transmit a transmission signal to the user apparatus, the transmission signal including the HARQ indicator channel at the transmit power determined by the transmit power control unit,
   wherein the transmit power control unit determines the transmit power for the HARQ indicator channel based on reference transmit power, reference radio quality information, downlink radio quality information and an offset, and different offsets are set depending on whether the transmission signal includes a control channel for allowing the uplink shared channel to be transmitted and whether the transmission signal includes the HARQ indicator channel indicative of the positive response.

2. The base station apparatus as claimed in claim 1, wherein if uplink scheduling grant is to be transmitted, the transmit power for the HARQ indicator channel is set to be zero.

3. The base station apparatus as claimed in claim 1, wherein if the HARQ indicator channel indicates the positive response, the transmit power for the HARQ indicator channel is increased, and if the HARQ indicator channel indicates the negative response, the transmit power for the HARQ indicator channel is decreased.

4. The base station apparatus as claimed in claim 1, wherein the transmit power control unit further determines the transmit power for the HARQ indicator channel based on downlink radio quality information reported from the user apparatus.

5. A base station apparatus for receiving an uplink shared channel from a user apparatus and informing the user apparatus whether the user apparatus has to retransmit the uplink shared channel, comprising:
   a transmit power control unit configured to determine transmit power for a HARQ indicator channel for indicating a positive response or a negative response to the uplink shared channel; and
   a transmitting unit configured to transmit a transmission signal to the user apparatus, the transmission including the HARQ indicator channel at the transmit power determined by the transmit power control unit,
   wherein different transmit power for the HARQ indicator channel is set depending on whether an uplink scheduling grant is to be transmitted, and
   wherein the transmit power control unit calculates the transmit power Power for the HARQ indicator channel in accordance with $$Power = Power_{Ref} + CQI_{Ref} - CQI + \Delta,$$

where $Power_{Ref}$ represents reference transmit power, $CQI_{Ref}$ represents reference radio quality information, CQI represents the downlink radio quality information, and $\Delta$ represents an offset,
   the offset $\Delta$ is set to different values for four cases:
   a case where the HARQ indicator channel indicative of the positive response is transmitted but the uplink scheduling is not transmitted;
   a case where the HARQ indicator channel indicative of the negative response is transmitted but the uplink scheduling is not transmitted;
   a case where both the HARQ indicator channel indicative of the positive response and the uplink scheduling are transmitted; and
   a case where both the HARQ indicator channel indicative of the negative response and the uplink scheduling are transmitted.

6. The base station apparatus as claimed in claim 1, wherein an interval between transmission timing of the uplink shared channel and retransmission timing of the uplink shared channel is predefined in a mobile communication system.

7. The base station apparatus as claimed in claim 1, wherein uplink scheduling grant indicates which radio resource is available in retransmission of the uplink shared channel.

8. A communication control method for use in a base station apparatus in a mobile communication system where retransmission control is supported, comprising:
   receiving an uplink shared channel from a user apparatus;
   generating a HARQ indicator channel indicating a positive response or a negative response to the uplink shared channel; and
   transmitting a transmission signal to the user apparatus, the transmission signal including a HARQ indicator channel set to certain transmit power,
   wherein the transmit power is determined for the HARQ indicator channel based on reference transmit power, reference radio quality information, downlink radio quality information and an offset, and different offsets are set depending on whether the transmission signal includes a control channel for allowing the uplink shared channel to be transmitted and whether the transmission signal includes the HARQ indicator channel indicative of the positive response.

9. A base station apparatus for receiving an uplink shared channel from a user apparatus and informing the user apparatus whether the user apparatus has to retransmit the uplink shared channel, comprising:

a transmit power control unit configured to determine transmit power for a HARQ indicator channel for indicating a positive response or a negative response to the uplink shared channel; and
a transmitting unit configured to transmit a transmission signal to the user apparatus, the transmission signal including the HARQ indicator channel at the transmit power determined by the transmit power control unit,
wherein different transmit power for the HARQ indicator channel is set depending on whether an uplink scheduling grant is to be transmitted, and
wherein the transmit power control unit calculates the transmit power Power for the HARQ indicator channel in accordance with $$\text{Power} = \text{Power}_{Ref} + \text{CQI}_{Ref} - \text{CQI} + \Delta,$$

where $\text{Power}_{Ref}$ represents reference transmit power, $\text{CQI}_{Ref}$ represents reference radio quality information, CQI represents the downlink radio quality information, and $\Delta$ represents an offset,
   the offset $\Delta$ is set to different values for three cases:
      a case where the HARQ indicator channel indicative of the positive response is transmitted but the uplink scheduling grant is not transmitted;
      a case where the HARQ indicator channel indicative of the negative response is transmitted but the uplink scheduling grant is not transmitted; and
   a case where both the HARQ indicator channel indicative of the positive response and the uplink scheduling grant are transmitted.

* * * * *